United States Patent [19]

Brown et al.

[11] Patent Number: 5,324,169
[45] Date of Patent: Jun. 28, 1994

[54] OSCILLATING, LATERAL THRUST POWER GENERATOR

[76] Inventors: George L. Brown, 3285 Sprig Dr., Benecia, Calif. 94510; Paul Hales, Heron's View, Norman's Bay, East Sussex BN24 6PU, United Kingdom

[21] Appl. No.: 45,372

[22] Filed: Apr. 9, 1993

[51] Int. Cl.$^5$ ............................................. F03B 3/00
[52] U.S. Cl. ..................................... 416/83; 416/79; 416/17
[58] Field of Search .................. 416/9, 10, 11, 12, 13, 416/17, 79, 80, 81, 82, 83

[56] References Cited

U.S. PATENT DOCUMENTS

| | | |
|---|---|---|
| 365,133 | 6/1887 | Kessler . |
| 393,316 | 11/1888 | Trumble ................. 416/82 |
| 419,321 | 1/1890 | Courtright ............... 416/83 |
| 827,889 | 8/1906 | Smith ..................... 416/80 |
| 1,302,889 | 5/1919 | Albisu .................... 416/83 |
| 1,479,216 | 1/1924 | Bott ...................... 416/83 |
| 4,024,409 | 5/1977 | Payne . |
| 4,465,941 | 8/1984 | Wilson et al. . |
| 4,470,770 | 9/1984 | Grose . |
| 4,486,145 | 12/1984 | Eldredge et al. . |
| 4,525,122 | 6/1985 | Krnac . |
| 4,595,336 | 6/1986 | Grose . |
| 4,730,119 | 3/1988 | Biscomb . |
| 5,009,571 | 4/1991 | Smith ..................... 416/79 |

FOREIGN PATENT DOCUMENTS 314034 7/1920 Fed. Rep. of Germany ........ 416/80

Primary Examiner—Edward K. Look
Assistant Examiner—James A. Larson
Attorney, Agent, or Firm—Harris Zimmerman

[57] ABSTRACT

An apparatus for power production from low velocity fluid flow includes a lateral support arm assembly extending from a vertical drive shaft. A power blade is pivotally secured to the distal end of the support arm, and constrained to pivot within a defined operating angle. The center of force on the power blade is proximal to the power blade pivot, so that at the limit of travel of the support arm the thrust on the power blade moves the power blade into an over-center position, causing the power blade to pivot in retrograde fashion. The pivoted power blade then drives the support arm away from the extreme position, through a neutral position, to the opposite angular position, where the process reiterates and reverses. Thus the lateral support arm is driven continuously in oscillating, lateral motion. An exciter blade joined to the proximal end of the support arm creates a force that augments the torque created by the power blade, and drives the arm past the over-center point of the power blade, causing the power blade to rotate and drive the arm retrograde toward the neutral position. A latch maintains the exciter blade aligned with the arm as it pivots from the neutral (midline) position toward the angular limit of the arm.

4 Claims, 5 Drawing Sheets

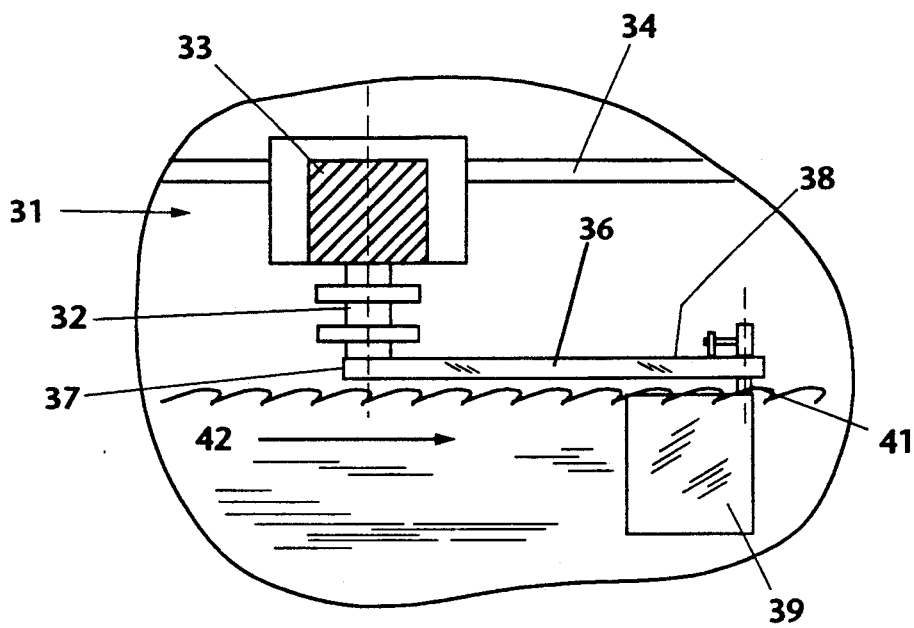
Figure_1
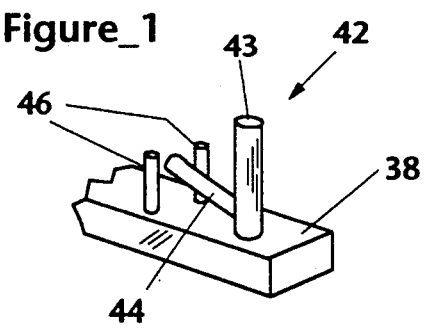
Figure_1A
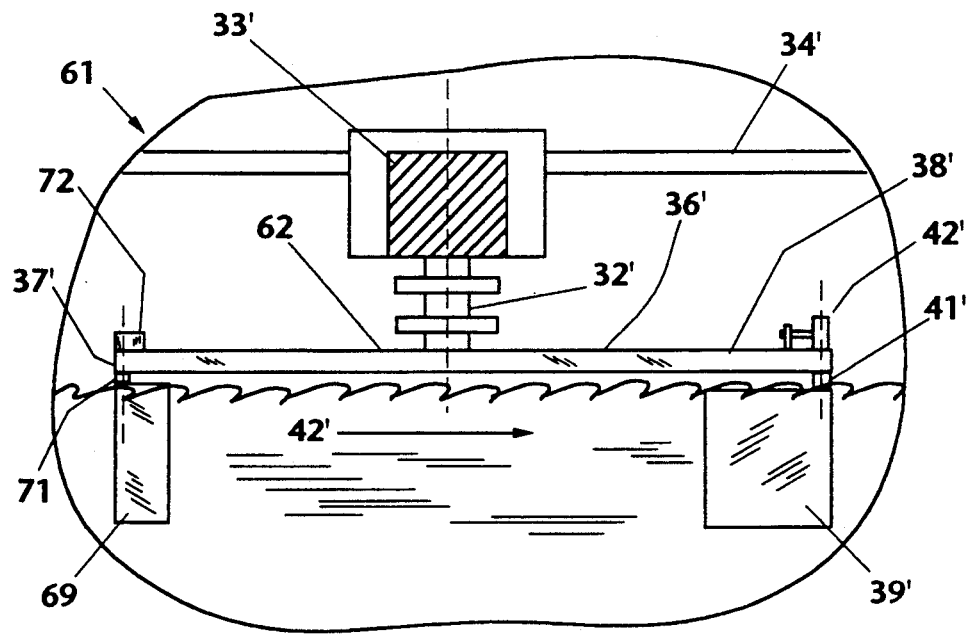
Figure_11

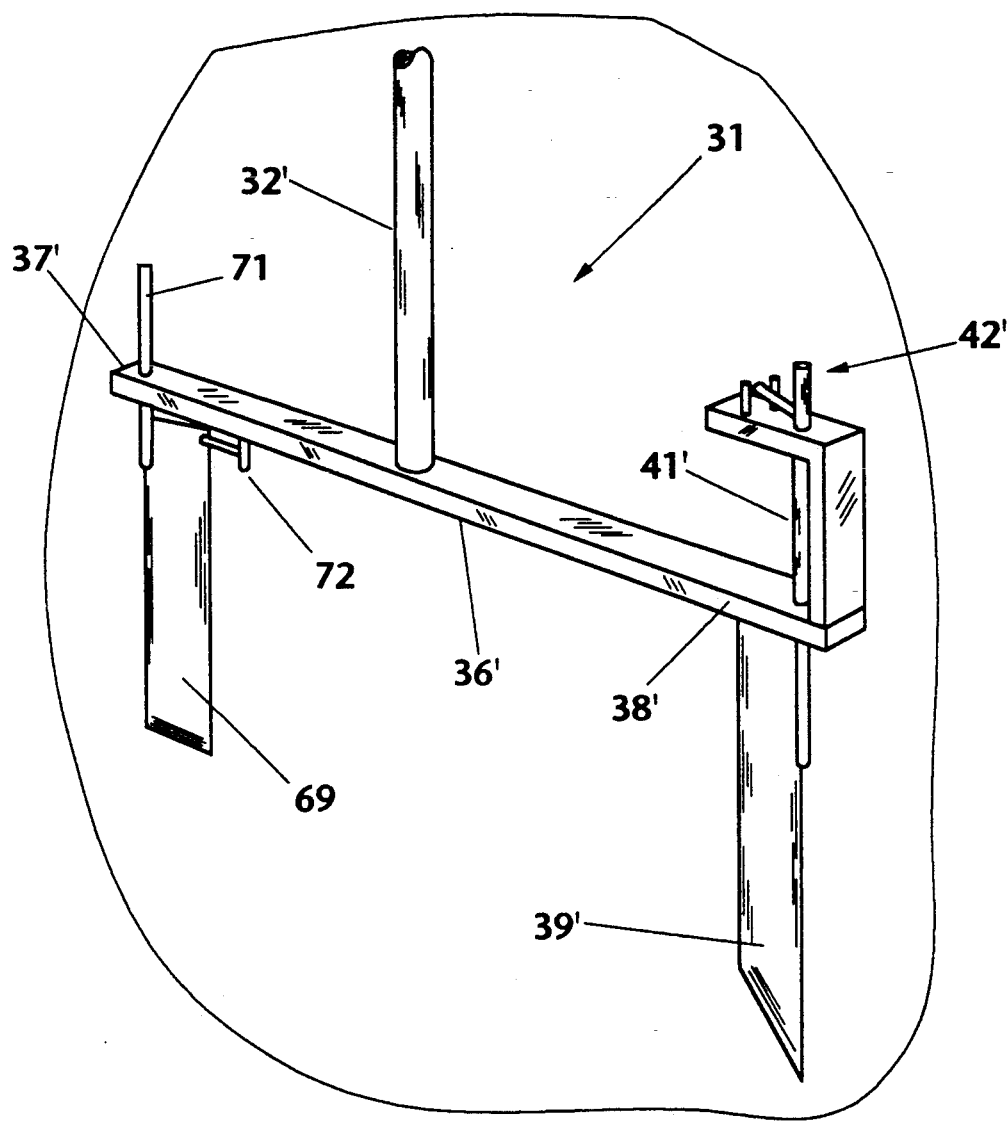
Figure_2

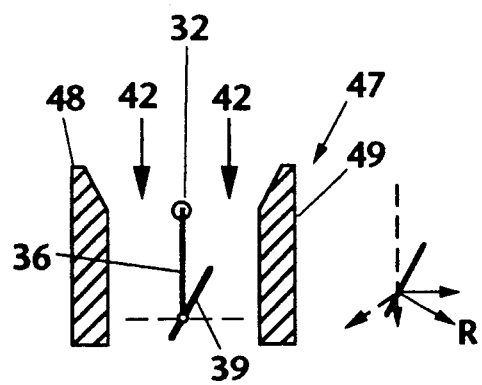
Figure_3
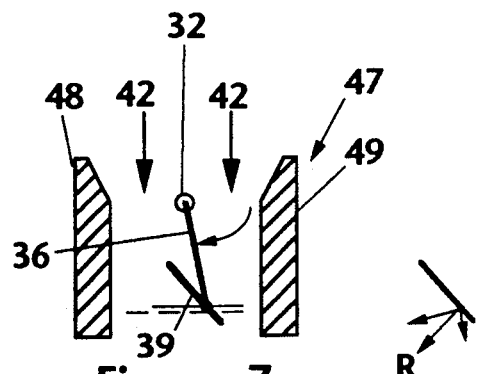
Figure_7
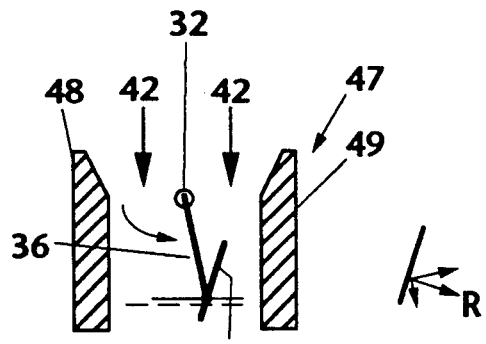
Figure_4
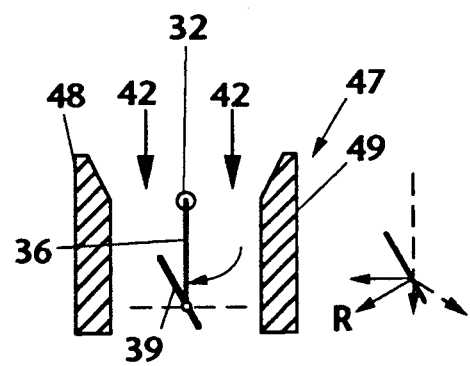
Figure_8
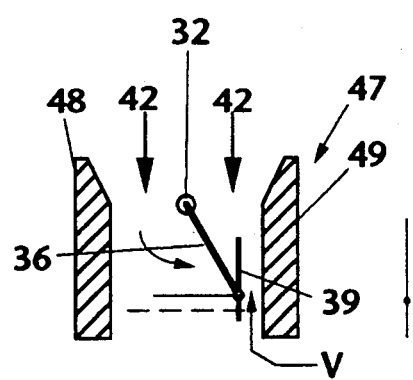
Figure_5
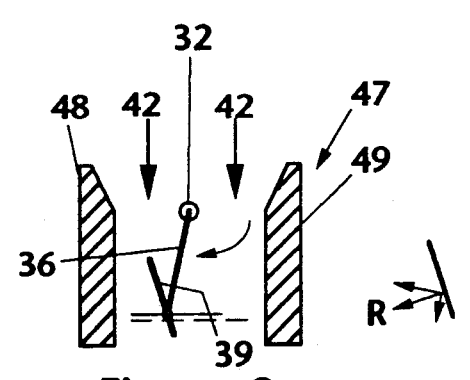
Figure_9
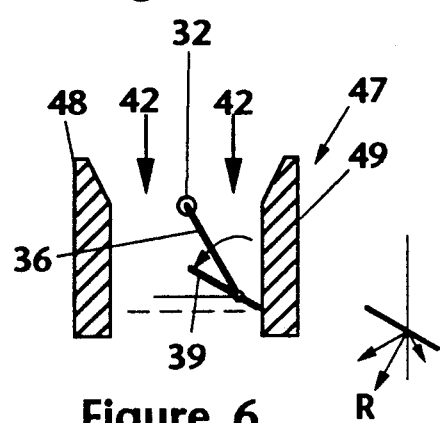
Figure_6
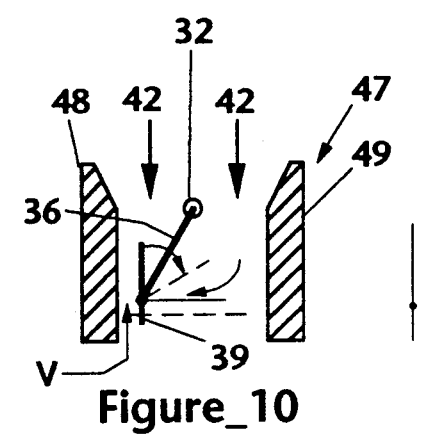
Figure_10

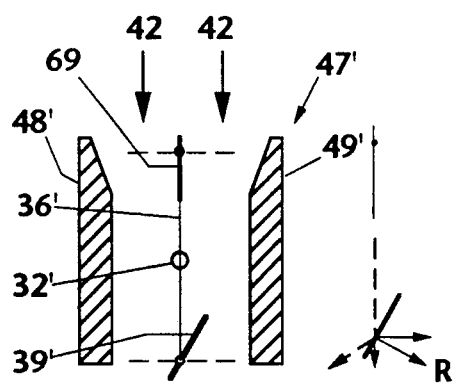
Figure_12
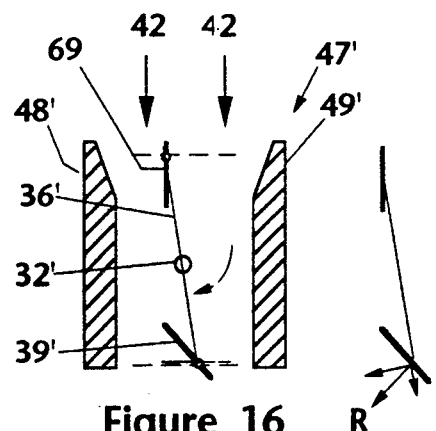
Figure_16
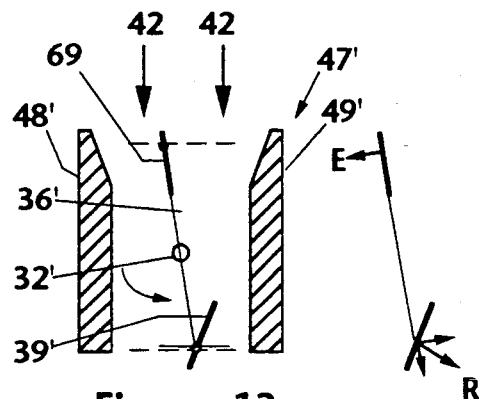
Figure_13
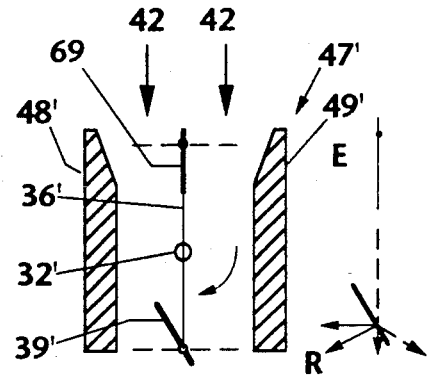
Figure_17
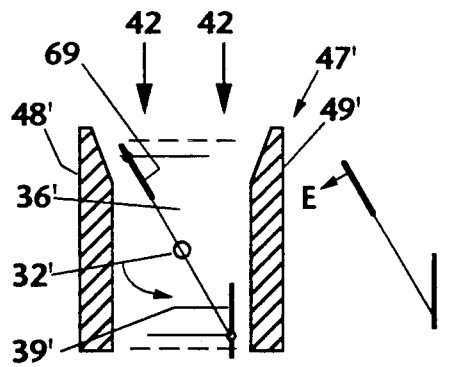
Figure_14
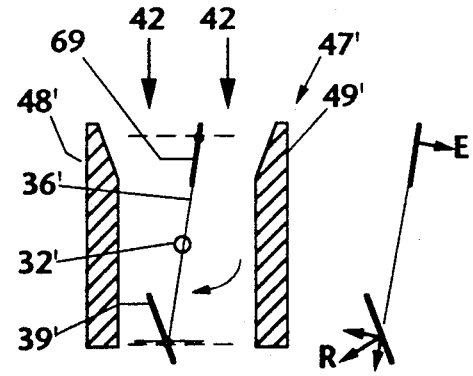
Figure_18
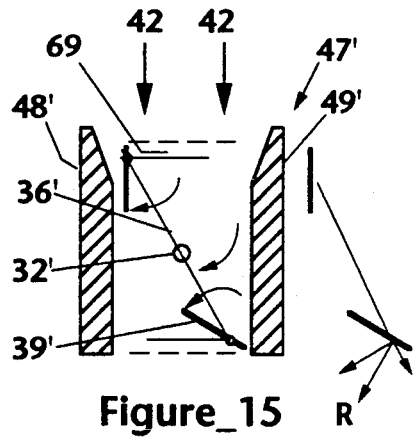
Figure_15
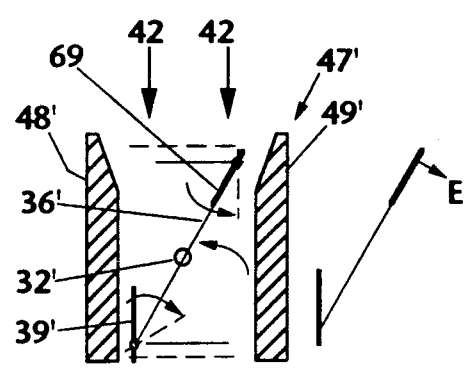
Figure_19

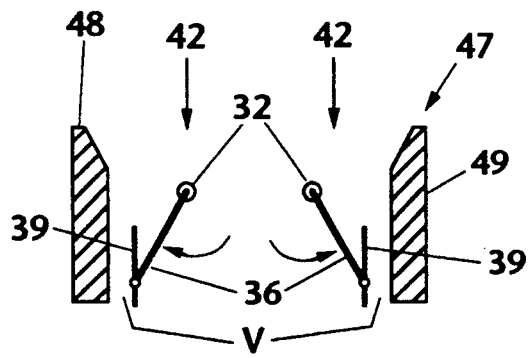
Figure_20
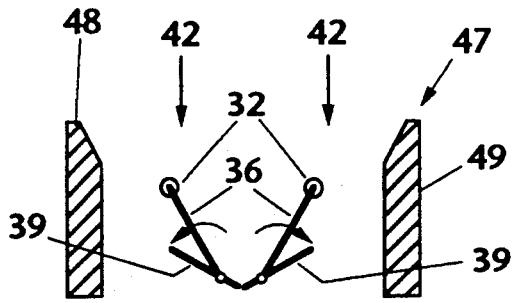
Figure_24
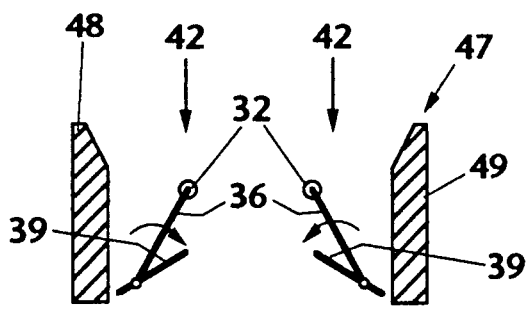
Figure_21
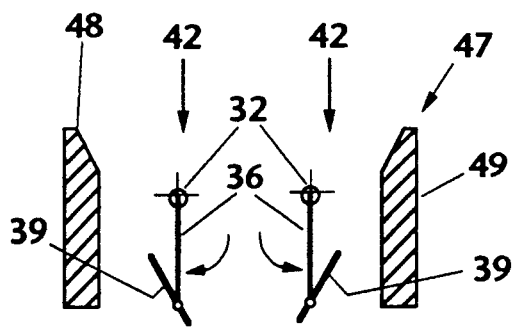
Figure_25
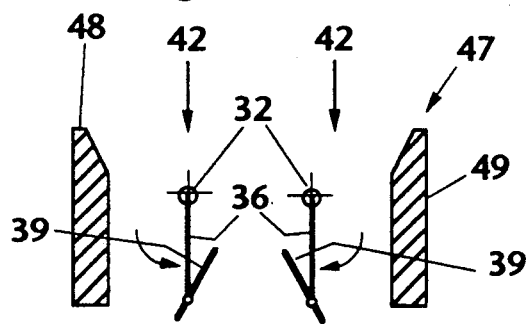
Figure_22
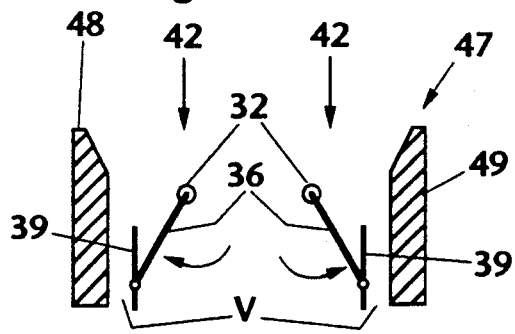
Figure_26
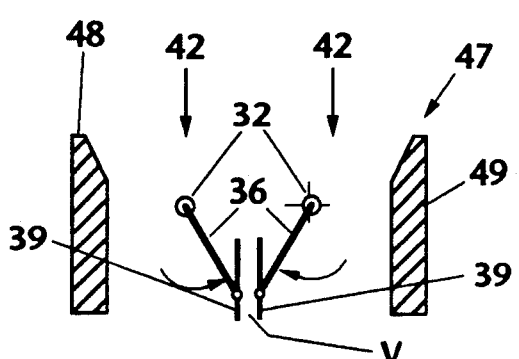
Figure_23
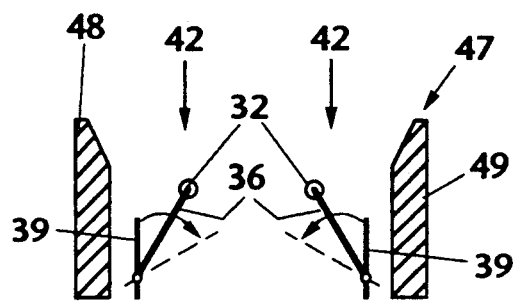
Figure_27

5,324,169

OSCILLATING, LATERAL THRUST POWER GENERATOR

BACKGROUND OF THE DISCLOSURE

The field of the present invention comprises power generation, and more specifically, power generation by renewable resources that have not yet been exploited.

There are two major factors that will control the continued success and survival of the world's peoples: population growth and energy consumption. Population growth is a social and cultural issue that cannot be resolved through invention. Energy consumption, however, can be addressed by technological innovation.

In industrialized areas of the world, most energy is consumed in the form of electricity and fossil fuels. Although non-industrialized countries often rely on wood or coal for energy, as countries become more modernized there is a trend toward greater use of electricity and fossil fuel. As a result, petroleum and proven petroleum resources are being consumed far faster than they are being discovered. The long-term implications are simple: an increasingly large world population, containing peoples desiring modern living standards, will consume constantly growing quantities of petroleum as the petroleum becomes increasingly scarce. To avoid a catastrophe, it is necessary to develop power resources that are renewable.

Renewable power resources include wood combustion, solar heating and photoelectric cells, wind generators, wave generators and hydroelectric power, and nuclear power. Nuclear power is fraught with problems, including safety issues, disposal of high level radioactive byproducts which persist for thousands of years, the relatively short useful life of a reactor due to degradation of materials from radiation exposure, and the expense of decommissioning a reactor. Wood combustion creates environmental problems when used on a large scale, and cannot produce electricity in an efficient manner. Sun power, including solar heating, photoelectric cells, and wind generators are erratic and require unusual concentrations of the source to be effective; i.e., an extremely sunny and clear location, or a very windy locale. Hydroelectric power generators generally require a large pressure head to be effective, which demands a high dam storing a large amount of water. As a result, hydroelectric power projects tend to be enormous, consuming a large amount of capital and natural resources. In addition, most sites suitable for hydroelectric generation have already been exploited.

Wave generators have also been developed to exploit the large amounts of energy present in ocean waves. However, wave motion tends to vary significantly in accordance with wind patterns, storm fronts, tidal flows, and the like.

There are many locations throughout the world where large masses of water flow in a constant and reliable manner, although the flows are at low velocity. Such locations, which provide great opportunities for exploitation of potential energy, include tidal flows, river flows, and deep ocean currents. For example, the Kuroshio Current flowing past the coast of Japan at Shikoku moves at a rate up to 5.5 knots, without the variations common to wind power and solar power. Likewise, the Gulf current flows along the Atlantic coast of the United States at a similar velocity. Tidal flows in places such as the Pentland Firth in Scotland, the Cook Inlet in Alaska, or the Bay of Fundy in Newfoundland provide reliable flows at higher velocities. Also, many large rivers of the world provide large masses of water flowing at relatively low velocity. Clearly, any technology that can exploit these low velocity energy sources could provide electricity both to industrialized and underdeveloped areas throughout the world.

SUMMARY OF THE PRESENT INVENTION

The present invention generally comprises a power generating apparatus adapted to convert potential energy in the form of low velocity, high kinetic energy fluid flow into electrical power, compressed fluid, or the like. The apparatus includes a vertical drive shaft, and a lateral support arm assembly extending from the drive shaft. The drive shaft is connected to a unidirectional clutch mechanism, so that oscillating rotational motion imparted to the shaft by the lateral support arm is converted into a unidirectional rotational output drive.

In the simplest form of the invention, a power blade is pivotally secured to the distal end of the lateral support arm, and constrained to pivot within a defined operating angle. The power blade is disposed to intercept a fluid flow thereby and produce a lateral force in response thereto. The center of force on the power blade is proximal to the power blade pivot, so that at the limit of travel of the lateral support arm the thrust on the power blade moves the power blade into an over-center position, causing the power blade to pivot in retrograde fashion. The pivoted power blade then drives the support arm away from the extreme position and toward a neutral position. The support arm continues rotating until it reaches the opposite extreme position, where the over-center thrust of the power blade pivots it once again in retrograde fashion to reverse the motion of the supporting arm. In this manner the lateral support arm is driven continuously in oscillating, lateral motion and the output motion is a continuous rotational drive.

In a further embodiment of the invention, the lateral support arm and power blade may be confined within a flow channel or flume having spaced apart side walls. The side walls are positioned so that when the lateral support arm reaches the limits of travel, the power blade is disposed adjacent to and closely spaced from one of the side walls. The resulting Venturi effect aids in turning the power blade retrograde to reverse the lateral support arm.

In another embodiment the vertical drive shaft is secured to a medial portion of the lateral support arm assembly. The power blade is secured to the distal end of the lateral support arm as described above. At the proximal end of the lateral support arm assembly, an exciter blade is secured in pivotal fashion, and a latch controls the angle of the exciter blade with respect to the lateral support arm. The latch operates to maintain the exciter blade aligned with the lateral support arm when the proximal end of the arm pivots from the neutral (midline) position toward the angular limit of the arm. Fluid flow against the exciter blade creates a force that augments the torque created by the power blade. The exciter blade also acts to drive the arm past the over-center point of the power blade, causing the power blade to rotate about its pivot and drive the arm retrograde toward the neutral position. The reversed motion of the support arm applies a sudden force to the exciter blade, causing the latch to release and allowing the exciter blade to pivot freely. The exciter blade remains free, minimizing drag, until the support arm rotates back to the neutral position, where the latch engages once again. The latched exciter blade then aids in driving the support arm to the opposite angular extreme, where the power blade flips once again and the latch releases the exciter blade.

The exciter blade latch may comprise any form of automatically latching mechanism known in the prior art, such as a spring detent, a magnetic detent, or the like.

Any of the embodiments described above may be produced in modular form and deployed singly or in arrays, depending on the nature and volume of the fluid flow. The modules may be embodied as buoyant units anchored in a tidal flow or river estuary, or may comprise submersible units having variable buoyancy that can be anchored on the sea floor in an ocean current.

BRIEF DESCRIPTION OF THE DRAWING

FIG. 1 is a side elevation of the simplest embodiment of the oscillating, lateral thrust power generator of the present invention.

FIG. 1A is an exploded view of one embodiment of the angular limiting mechanism of the power blade of the invention.

FIG. 2 is a perspective view of a further embodiment of the oscillating, lateral thrust power generator of the present invention.

FIGS. 3-10 are a sequence of schematic views depicting the operation of the oscillating, lateral thrust power generator of FIG. 1.

FIG. 11 is a side elevation of the embodiment of the oscillating, lateral thrust power generator depicted in FIG. 2.

FIGS. 12-19 are a sequence of schematic views depicting the operation of the embodiment depicted in FIGS. 2 and 11.

FIGS. 20-27 comprise a sequence of schematic views depicting the operation of a further embodiment featuring paired power blades.

DESCRIPTION OF THE PREFERRED EMBODIMENT

The present invention generally comprises a power generating apparatus adapted to convert potential energy in the form of low velocity, high kinetic energy fluid flow into electrical power, compressed fluid, or the like. With regard to FIG. 1, the apparatus 31 includes a vertical drive shaft 32 having an upper end connected to a power generating machine 33. The machine 33 may comprise a unidirectional clutch mechanism, known in the prior art, coupled to an electrical generator, compressor, turbine, pump, or the like. The machine 33 may also comprise a two-stroke device, such as a piston pump, for producing pressurized fluid. The output of the machine 33 is delivered through cable, conduit, or pipe associated with structural member 34 which supports the power generating machine 33.

A lateral support arm 36 has a proximal end 37 joined to the lower end of the vertical shaft 32. At the distal end 38 of the arm 36, a power blade 39 is secured to the arm by a pivot shaft 41 extending generally vertically from the arm. The apparatus 31 is immersed in a flowing fluid, such as a tidal flow channel, a river estuary, or a deep ocean current, and may be submerged or floating at the surface. It is significant that the direction of flow is from proximal to distal ends of the lateral support arm, and that the center of force on the power blade is proximal to the power blade pivot shaft 41. As a result, any force exerted by the fluid flow on the power blade creates torque about both the drive shaft 32 and the pivot shaft 41, and these two torques are always acting in opposite directions.

The apparatus also includes an assembly 42, as shown in FIG. 1A, for limiting the angular excursion of the power blade about the axis of the pivot shaft 41. The upper end 43 of the pivot shaft 41 extends upwardly from the distal end of the lateral support arm 36, and an arm 44 extends laterally and generally proximally from the upper end 43. A pair of stops 46 extend upwardly from the arm 36, and are disposed to straddle the arm 44. The stops 46, which may be adjustable, limit the travel of the arm 44 and thus the angular excursion of the shaft 43. The assembly 42 constrains the power blade 39 to a defined angular deviation from the centerline of the lateral support arm, generally in the range of $\pm 30°$ to $\pm 45°$. Assembly 42 as shown is merely exemplary, and there are many other forms of angle limiting mechanisms that may be used for this purpose without departing from the scope of the invention.

The operation of the embodiment of the power generating apparatus 31 described above is depicted in the sequential FIGS. 3-10. The apparatus 31 is placed in a flow duct or flume 47. In FIG. 3, the support arm 36 is disposed at 0° to the fluid flow direction 42, and the power blade is disposed at 30° to the support arm 36. The angle of the power blade in the fluid flow creates a resultant force R that drives the arm 36 counterclockwise about the shaft 32. The shaft 32 rotates, generating power, or compressing a fluid, or similar useful work. As shown in FIG. 4, as the arm 36 rotates from the 0° position of FIG. 3 the resultant force R begins to decrease as the angle of attack of the power blade decreases. At the maximum limit of travel of the support arm 36, shown in FIG. 5, the angle of attack becomes zero and the power blade 39 is in an unstable configuration with respect to the fluid flow 42.

A Venturi effect V is established between the power blade 39 and the adjacent duct wall 49, which aids in moving the power blade past the unstable over-center position. The fluid flow 42 pushes the power blade to pivot about the shaft 41 until it impinges on the opposite stop 46, as shown in FIG. 6. The new angular disposition of the power blade in the fluid flow then creates a resultant force R that drives the arm 36 clockwise about the shaft 32 (FIG. 7). The power blade generates a maximum force at the zero degree angle, shown in FIG. 8, and continues to rotate the support arm 36 to the opposite maximum limit of travel, as shown in FIG. 10. At this point the Venturi effect established between the duct side wall 48 and the power blade at 0° moves the power blade past the unstable over-center position and causes the blade to pivot about the shaft 41. The system is thus set to resume counterclockwise motion. Thereafter the system continues to operate cyclically as described, the support arm oscillating in lateral motion and rotating the vertical shaft 32 to generate power or do useful work. It may be appreciated that the power blade may be dimensioned to generate substantial torque at the shaft 32, although the support arm 36 rotates slowly. It should be noted that the range of angular excursion of the power blade affects the rotational speed and torque of the support arm: as the angular excursion is decreased, the rotational speed of the support arm increases while the period of oscillation and the torque both decrease.

With regard to FIGS. 2 and 11, a further embodiment 61 of the power generating apparatus includes elements similar to the previous embodiment which are labeled with similar reference numerals bearing a prime (') designation. The vertical shaft 32 is joined to a medial portion 62 of the support arm 36', and the power blade 39' is secured to the pivot shaft 41' at the distal end 38' of the support arm. Likewise, an angle limiting assembly 42' is secured to the distal end 38. A salient feature of the apparatus 61 is the provision of an exciter blade 69 at the proximal end 37' of the lateral support arm 36. A pivot shaft 71 is supported at its upper end by the support arm 36 and extends downwardly therefrom to join the exciter blade. The shaft 71 is joined adjacent to the leading (proximal) edge of the blade 69. A latch mechanism 72 is operatively connected to the shaft 71 and the support arm, and arranged to releasably latch the exciter blade 69 in alignment with the support arm 36, for purposes to be explained below.

The operation of the apparatus 61 is depicted in the sequential FIGS. 12-19. The apparatus may be placed in a flow duct or flume 47' having opposed side walls 48' and 49', although the flume is not necessary. In FIG. 12, the support arm 36' is disposed at 0° to the fluid flow direction 42, the power blade is disposed at 30° to the support arm 36', and the exciter blade 69 is latched in alignment with the support arm 36'. The angle of the power blade in the fluid flow create a resultant force R that drives the arm 36' counterclockwise about the shaft 32'. The shaft 32 rotates from the neutral position, as shown in FIG. 13, and the exciter blade assumes an angle in the fluid flow that causes a force E to be applied to the proximal end of the lateral support arm 36' in a force couple to the force R created by the power blade 39. It is significant that as the force R decreases with increasing angular movement from the neutral position, the force E increases as the exciter blade 69 moves into an increasingly oblique angle with the fluid flow 42. The force couple generates far more torque than the power blade by itself.

When the support arm 36' rotates to an angular disposition where the power blade 39' is disposed at 0° to the fluid flow (FIG. 14), the force E from the exciter blade continues to move the support arm through the over-center position, causing the power blade 39' to rotate counterclockwise about the shaft 41' and flip to the opposite angle stop, as shown in FIG. 15. The power blade suddenly exerts a force R on the support arm that opposes the force E of the exciter blade 69, tending to move the exciter blade against the fluid flow. The resulting load on the exciter blade 69 causes the latch 72 to release, permitting the exciter blade to pivot freely in the fluid flow 42. The blade 69 thus assumes the minimum drag orientation, as shown in FIGS. 15 and 16.

Thereafter the support arm is driven to rotate clockwise solely by the force R of the power blade 39'. When the support arm 36' has rotated once again to the neutral position (FIG. 17), the latch 72 re-engages automatically with the exciter blade 69 aligned with the support arm. The support arm is then driven further in the clockwise direction by the force couple of E and R (FIG. 18), until the support arm 36' rotates to the point where the power blade 39' is once again at 0° to the fluid flow 42. Once again the force E of the exciter blade moves the support arm 36' through the over-center position of the power blade, causing the power blade 39' to rotate clockwise about the shaft 41'. The reversed thrust R of the power blade causes the latch 72 to release, permitting the exciter blade to pivot freely in the fluid flow 42 as the support arm begins to return counterclockwise.

The process described above reiterates indefinitely, generating power or doing useful work. It may be appreciated that the combination of the exciter blade and the power blade provides enhanced torque, a positive means of driving the power blade to rotate at the maximum excursion of the lateral support art, and a minimum of drag from the exciter blade. The combination may also be used without the flow duct of flume 47, due to the fact that the Venturi effect is not required to advance the power blade past the over-center point.

A further embodiment of the invention involves the use of paired generating devices to multiply the effectiveness and capacity of the invention. With regard to sequential FIGS. 20-27, a pair of power generating assemblies, including vertical shafts 32, lateral support arms 36, and power blades 39, are disposed in laterally adjacent fashion within a flow duct or flume 47 having opposed side walls 48 and 49. The support arms are arranged to rotate in opposite directions, and the vertical shafts 32 may be linked by standard gearing to counter-rotate in synchronism. In FIG. 20, the support arms 36 have rotated divergently to their angular limits, their respective power blades 39 being disposed at 0° to the fluid flow 42. The Venturi effect established with the power blades 39 and the respective adjacent duct side walls 48 and 49 causes the power blades to be moved through their over-center positions, so that the flow 42 forces the blades to rotate about their respective pivot shafts 41, as shown in FIG. 21.

The power blades are thus disposed to urge the support arms 36 to rotate in converging fashion, as shown in FIGS. 22 and 23. In the disposition depicted in FIG. 23, the arms 36 have rotated and converged to the point where the power blades are parallel and adjacent, and are once again at 0° to the fluid flow 42. A Venturi effect created between the adjacent power blades 39 urges the blades past the over-center position, so that the blades rotate divergently, as shown in FIG. 24. The thrust caused by the power blades is thus reversed, driving the arms 36 to rotate divergently, as shown in FIGS. 25 and 26. When the arms 36 attain the position depicted in FIG. 27, a full cycle has been completed, and the power blades 39 rotate once again to reverse the thrust on the support arms. This process reiterates indefinitely. Thus the vertical shafts 32 are driven to rotate cyclically in opposite directions, and may be coupled to any power-generating or work-producing apparatus.

It may be appreciated that any of the embodiments described herein may be embodied in a modular structure, and that groups or arrays of such structures may be deployed within any suitable natural flow, such as a river current, deep ocean current, tidal current, or the like. The generators within a group of modules may be arranged to be phased in staggered fashion to provide a constant output level. Modules may be fabricated with buoyancy chambers, so that the modules may be tethered either at or near the surface of a body of water, or submerged and anchored at the floor of a body of water. This factor facilitates the protection of surface modules from storm damage merely by temporarily sinking the modules below the level of storm effect, and then raising the modules after storm passage.

A major advantage of the embodiments of the invention is that energy production is constant within a constant current, and that the modules will swing about an anchor or tether line to assume the optimum angle for power generation. Moreover, the devices are simple and inexpensive to manufacture, require very little maintenance, and are easily replaced.

We claim:

1. A device for producing useful work from a directional fluid flow, including:
   a drive shaft connected to a machine for producing useful work;
   a support arm secured to said drive shaft and disposed in said fluid flow, said support arm having a longitudinal axis and a proximal end and a distal end, said fluid flowing past said proximal end toward said distal end of said support arm;
   a pivot shaft secured in rotatable fashion to said distal end of said support arm;
   a power blade having a distal portion secured to said pivot shaft and arranged to rotate with said pivot shaft, said power blade disposed obliquely in said fluid flow to create a force in reaction to said fluid flow, said force being generally perpendicular to and spaced apart from said drive shaft to exert torque on said support arm to rotate said support arm about the axis of said drive shaft between angular extremes;
   means for limiting the range of rotation of said power blade to a first pair of angular excursion limits spaced generally equally from said longitudinal axis of said support arm;
   said power blade including a proximal edge rotatable about the axis of said pivot shaft between said angular excursion limits to reverse said force and said torque on said support arm and rotate said drive shaft in retrograde fashion in oscillating rotation;
   means for rotating said power blade toward one of said pair of angular excursion limits as it reaches the other of said angular excursion limits, whereby said oscillating rotation of said drive shaft is sustained indefinitely; and,
   further including an exciter blade disposed in said fluid flow, and means for securing said exciter blade to said proximal end of said support arm to react to said fluid flow and augment said torque generated by said power blade.

2. The device for producing useful work of claim 1, wherein said drive shaft is secured to a medial portion of said support arm.

3. The device for producing useful work of claim 1, wherein said means for securing said exciter blade to said proximal end of said support arm includes an exciter blade pivot shaft extending from said support arm, said exciter blade secured to said exciter blade pivot shaft, whereby said exciter blade is rotatable with respect to said support arm.

4. The device for producing useful work of claim 10, further including latch means operatively connected between said support arm and said exciter blade to latch said exciter blade in longitudinal alignment with said support arm as said support arm rotates from a disposition collinear with said direction of fluid flow to either of said angular extremes of rotation of said support arm, and to allow said exciter blade to rotate freely on said pivot shaft as said support arm rotates from either of said angular extremes of rotation toward a disposition collinear with said direction of fluid flow.

* * * * *